Aug. 26, 1941.      G. T. SMITH      2,253,734

HOOK, SHACKLE, AND THE LIKE

Filed Aug. 15, 1939

Inventor
George Thompson Smith
By
Pennie, Davis, Marvin & Edmonds
Attorneys.

Patented Aug. 26, 1941

2,253,734

UNITED STATES PATENT OFFICE 2,253,734

HOOK, SHACKLE, AND THE LIKE

George Thompson Smith, Loughborough, England, assignor to Herbert Morris Limited, Loughborough, England, a British company Application August 15, 1939, Serial No. 290,329
In Great Britain March 27, 1939

2 Claims. (Cl. 59—95)

This invention relates to improvements in and connected with hooks, and in the means for attaching such hooks to the bodies to be suspended therefrom, or to bodies from which such hooks are suspended and more especially to lifting hooks for use on cranes or pulley blocks.

The invention has for an object to provide a hook assembly in which the disadvantages attaching to the use of screwed or riveted-over shanks are avoided while ensuring maximum strength within the minimum overall dimensions.

In accordance with the present invention the hook terminates in a forked shank adapted to engage a swivel pin provided with a shaped integral head adapted to be accommodated in a correspondingly shaped seating provided in the body to be suspended from the hook or in the body from which the hook is to be suspended. Preferably the headed swivel pin is accommodated in a rotatable spindle. The shank of the hook and the swivel pin can be secured together by means of a bolt, rivet or the like.

Figure 1:
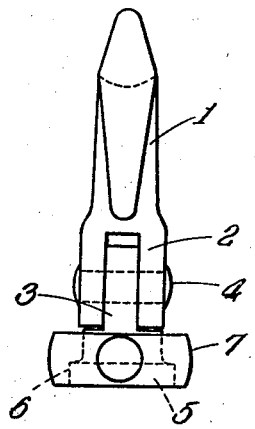
Figure 2:
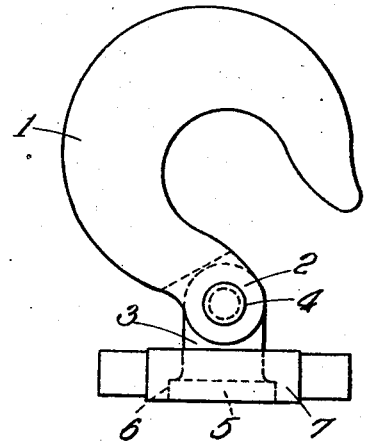
Figure 3:
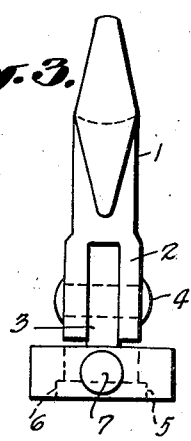
Figure 4:
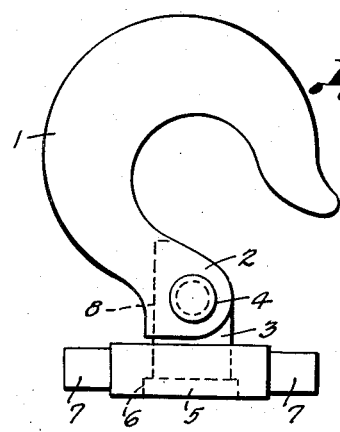

The invention is illustrated in the accompanying drawing in which Fig. 1 is an end elevation and Fig. 2 a side view of a hook assembly constructed in accordance with the present invention, Figs. 3 and 4 being respectively an end elevation and a side view of a modified construction.

Referring to the drawing, 1 denotes a hook terminating in a forked shank 2 adapted to engage a swivel pin 3. The shank 2 and swivel pin 3 are secured together by means of a rivet or the like 4.

The head 5 of the swivel pin is accommodated in a recess 6 in the spindle 7 which is assumed to be rotatable in a body such as a pulley block (not shown) to be suspended from the hook 1 or in a recess in a body from which the hook 1 is to be suspended. The hook thus can rotate with the swivel pin 3 about the axis of the latter and/or pivot about the connecting rivet 4 or the like. It may also rotate about the axis of the spindle 7.

If desired, and as shown in Figs. 3 and 4, the connection between the swivel pin 3 and the shank 2 of the hook 1 or the like may be made rigid by providing the forked shank 2 of the hook with a rear face adapted to abut against the swivel pin 3 where indicated by the dotted line denoted by the reference numeral 8.

I claim:

1. A lifting hook assembly comprising a hook, a headed swivel pin, a rivet pivotally connecting the hook to the swivel pin, and a rotatable spindle having a recess arranged to receive the headed swivel pin, the axis of said swivel pin extending transversely of the axis of rotation of the spindle, said recess forming a bearing for the headed swivel pin permitting said pin and hook to rotate as a unit about the axis of the pin.

2. A lifting hook assembly comprising a hook, said hook having a bifurcated end portion, a headed swivel pin, said swivel pin being pivotally mounted in the bifurcated end portion whereby the hook may rotate with respect to an axis at 90° to the axis of the swivel pin, and a rotatable spindle having a recess arranged to receive the headed swivel pin, the axis of said swivel pin extending transversely of the axis of said spindle, said recess forming a bearing for the head permitting said pin and hook to rotate as a unit about the axis of the pin.

GEORGE THOMPSON SMITH.